J. S. WHEELER.
HEADLIGHT.
APPLICATION FILED MAR. 29, 1921.

1,425,562.

Patented Aug. 15, 1922.
2 SHEETS—SHEET 1.

WITNESSES

INVENTOR
J. S. Wheeler,
BY
ATTORNEYS

UNITED STATES PATENT OFFICE.

JAMES SAMUEL WHEELER, OF MESA, ARIZONA.

HEADLIGHT.

1,425,562.      Specification of Letters Patent.    Patented Aug. 15, 1922.

Application filed March 29, 1921. Serial No. 456,686.

*To all whom it may concern:*

Be it known that I, JAMES SAMUEL WHEELER, a citizen of the United States, and a resident of Mesa, in the county of Maricopa and State of Arizona, have invented certain new and useful Improvements in Headlights, of which the following is a specification.

This invention relates to a headlight of the type particularly adapted for automobiles or other vehicles.

The object of the invention is to provide a headlight which may be adjusted for projecting its light immediately before the automobile or vehicle with which it is associated or further forward of the automobile or vehicle if so desired.

It is also an object of the invention that the rays of light projected from the headlight will be of a diffused character so that they will not blind the driver of an oncoming automobile or vehicle.

Other objects and objects relating to details of construction, combination and arrangement of parts will hereinafter more definitely appear.

The invention is illustrated by way of example in the accompanying drawings, in which.

Figure 1:
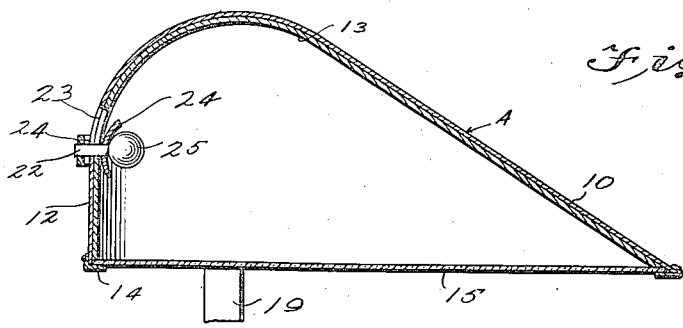
Figure 1 is a central vertical longitudinal section of the headlight illustrating the preferred embodiment of my invention.
Figure 2:
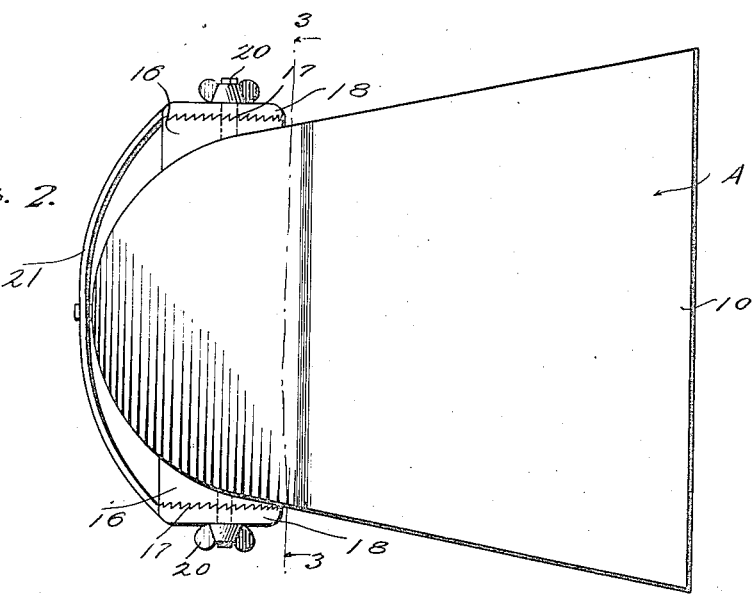
Figure 2 is a top plan view of the same.
Figure 3:
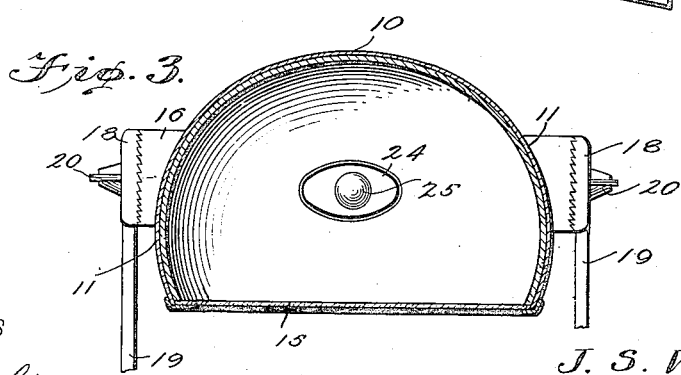
Figure 3 is a transverse vertical section taken substantially on the line 3—3 of Figure 2.

Referring to the drawings in detail and particularly to Figures 1 to 3 inclusive, A indicates generally a lamp casing or housing which in this instance has substantially the shape of an inverted scoop of which 10 is the bottom or in this instance the top, 11 the sides and 12 the rear end. A reflector lining is provided for the interior of the casing as generally indicated at 13 and about the edge of said casing there is secured an angle strip 14. The strip 14 is adapted to support the closure 15, said closure being of any suitable transparent material and preferably of glass as shown. The closure 15 in turn supports the lining 13 as shown in Figures 1 and 3.

On each side 11 of the casing A there is formed a boss 16. Each boss has extending therethrough a bolt 17 which is secured against movement with relation to said boss or casing. The end of each boss 16 is serrated and adapted to receive a like serrated cap 18. Each cap 18 is formed with a downwardly extending arm 19 which is adapted to support the lamp as a whole upon the frame of the automobile or vehicle with which the lamp may be associated. Each bolt 16 is also provided with a wing nut as indicated at 20 by which the caps 18 may be held in their engaged position with the bosses 16. Also formed with the cap 18 and extending therebetween is a bow-shaped member 21. Upon this member at a central point thereof, there is suitably mounted a lamp socket as indicated at 22, said socket extending through registering slots formed in the casing A and lining 13 as indicated generally at 23.

The inner end of the socket 22 carries a hemispherical shaped reflector plate 24 which is stationary with respect to the light 25 also carried by said socket.

In the operation of the headlight heretofore described the forward end of the casing A may be tilted upward or downwardly by the manipulation of the wing nuts 20 and held in any position desired. The slots 23 are of sufficient length to permit this tilting movement of the casing A without any movement on the part of the socket 22 for the reflector 24 and light 25 carried thereby. By the tilting movement of the casing A the same may be adjusted so that the light therefrom projecting through the closure 15 will be thrown immediately forward to the automobile or vehicle with which the light may be associated, or further forward of the automobile or vehicle if so desired. The reflector 24 for the light 25 directs the rays emanating therefrom in a substantially straight forward line against the forward portion of the reflector lining 13. The reflector lining 13 in turn directs the rays downwardly and through the transparent closure 15. In this manner the rays from the light 25 are diffused and all blinding effects eliminated.

Figure 4:
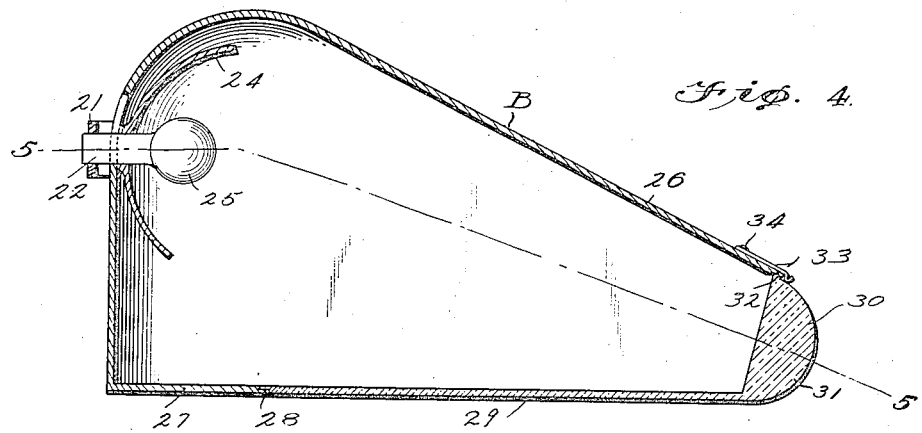
Figure 4 is a view similar to Figure 1, but showing a modification of my invention.
Figure 5:
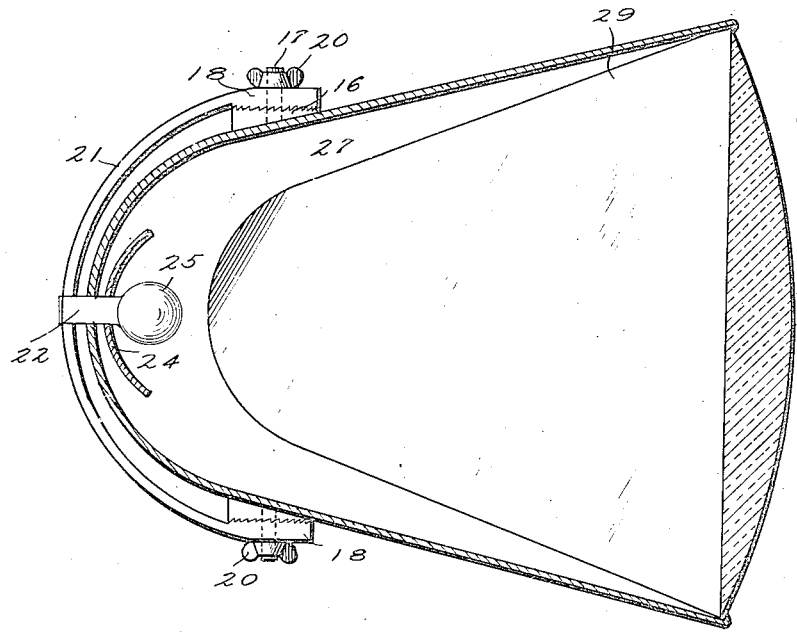
Figure 5 is a longitudinal section taken substantially on the line 5—5 of Figure 4.
Figure 6:
Figure 6 is a detailed view of the spring latch element.

Referring to Figures 4 to 6 inclusive in which I have shown a modified form of my invention B indicates a casing of substantially the same shape as the casing A shown in Figure 1 with the exception that the top 26 is less inclined than the top 10 of the casing A. Also from the side and rear edge of the casing B there emanates a flange as indicated at 27, said flange gradually decreasing in width toward the forward end of the casing as shown. About the inner edge of the flange 27 there is formed an offset as indicated at 28 and is adapted to receive a like offset surface of the inner end of the glass plate closure 29. The plate closure 29 terminates at its outer end in a lens portion 30, said lens portion having a convex outer surface as at 31 and an inner surface 32 substantially at right angles to the surface of the plate closure 29. The upper end of the lens 30 is formed with a bead as indicated at 32 and by the means of a spring clip 33, said plate closure 29 and lens 30 are held in position. The spring clip 33 is secured to the top portion of the casing B by the means of screws or rivets as indicated at 34. The mounting means for the casing B for permitting the upward and downward tilting movement of its forward end is substantially the same as that for the casing A and therefore a detailed description thereof will not be given. The parts constituting the mounting means together with the parts for mounting the lamp in the casing B will however be given reference numerals corresponding to the numerals used for like parts in Figures 1 to 3 inclusive so that the same may be identified.

In the operation of the modified form of lens as shown in Figures 4 to 6 inclusive the rays of light are projected forwardly by the reflector 24 in a substantially horizontal plane. A portion of the light is in turn reflected downwardly and through the glass plate closure 29 and also a portion of the rays are bent by the action of the top of the casing 26 and projected through the lens 30. This extends the rays thrown or projected from the casing 26 at a further distance forward to the automobile or vehicle with which the lamp may be associated than is the case with the use of the invention shown in Figures 1 to 3 inclusive, that is to say, in the use of my modified form of invention a very small amount of tilting movement of the casing B is required in order to throw as far forward as desired the rays emanating therefrom.

I claim:

1. In a headlight of the class described, comprising in combination, an inverted casing having a forward sloping top wall, a transparent closure for forming the bottom of said casing, a light mounted in the rear end of said casing, and a condenser lens interposed between the forward end of said closure and the top wall.

2. In a headlight of the class described, comprising in combination, an inverted scoop-shaped casing, a transparent closure therefor, an electric lamp socket extending through a vertical recess in the rear wall of said casing, a stationary support for said lamp socket, and mounting means for said casing and said stationary support whereby the casing may be adjustably tilted forwardly or rearwardly while said lamp and support remain stationary.

3. In a headlight of the class described, comprising in combination, an inverted scoop-shaped casing, a transparent closure therefor, an electric lamp socket extending through a vertical recess in the rear wall of said casing, a stationary support for said lamp socket, mounting means for said casing and said stationary support whereby the casing may be adjustably tilted forwardly or rearwardly while said lamp and support remain stationary, and a reflector carried by said lamp socket adapted to throw the light rays from said electric lamp forwardly and also adapted to substantially close the recess through which said lamp socket extends.

4. A headlight of the character described, comprising in combination, an inverted scoop shaped casing having a portion of its rear end formed with a bottom closure, a transparent closure adapted to complete the bottom of said casing, a lens at the forward end of said transparent closure adapted to form the forward end wall of the casing, and a light carried by the rear wall of said casing adjacent the upper end thereof.

JAMES SAMUEL WHEELER.